Figure 1:
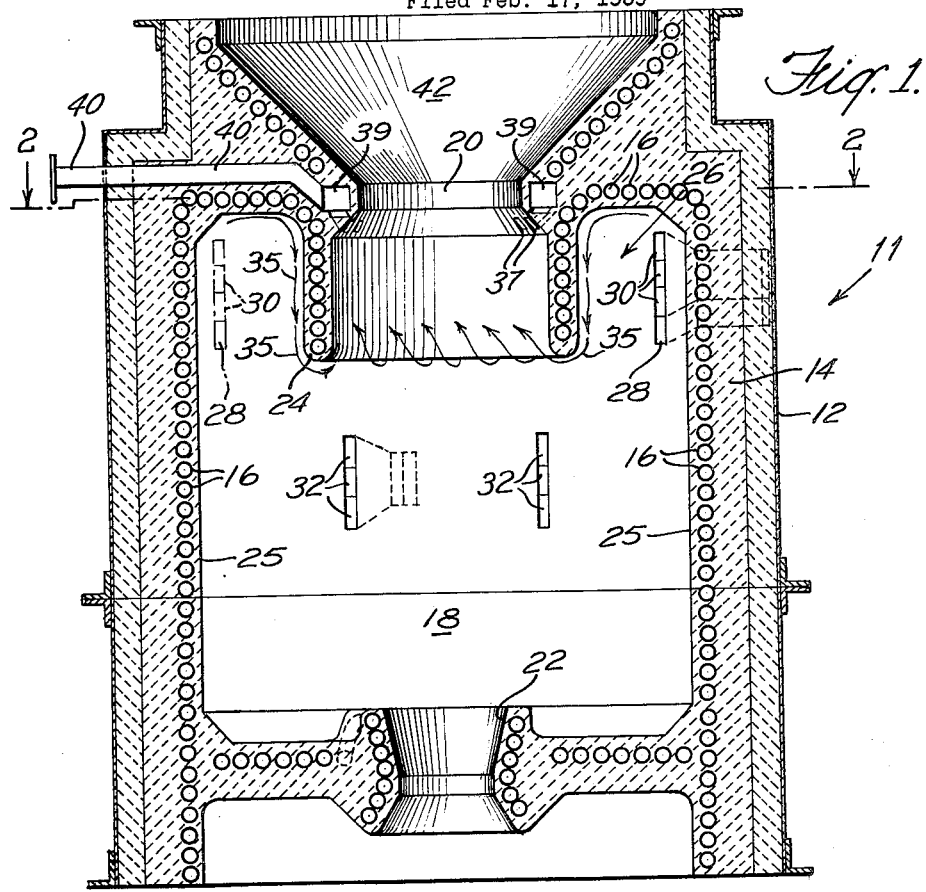

June 19, 1962  M. N. AREF  3,039,406

CYCLONE FURNACE

Filed Feb. 17, 1959

United States Patent Office 3,039,406
Patented June 19, 1962

3,039,406
CYCLONE FURNACE
Mohamed N. Aref, Newark, N.J., assignor to Foster Wheeler Corporation, New York, N.Y., a corporation of New York
Filed Feb. 17, 1959, Ser. No. 793,719
7 Claims. (Cl. 110—28)

This invention relates to apparatus for burning slag forming fuels and more particularly to cyclone type furnaces.

Basically, the design of a cyclone furnace is that of a water-cooled cylinder in which complete combustion of the fuel takes place. Fuel to be fired is introduced tangentially at one end of the furnace in a high velocity stream of primary air which consists of approximately ten to fifteen percent of the total combustion air. The function of the primary air supply is to impart a whirling motion to the fuel as it enters the furnace, which is further increased by secondary air, being passed tangentially into the furnace at a high velocity. The stream of primary air and fuel flows along the wall of the furnace chamber and as it moves along such wall is exposed to high temperature conditions present in the combustion chamber of the furnace. Fines in the fuel mixture are ignited on entrance and the combustion of the fines aids the ignition and combustion of the larger fuel particles as the stream whirls about the combustion chamber in a helical path as a film along the circumferential wall. The rapid combustion of the fuel particles results in an early release of the ash content thereof and due to the centrifugal effect thereon, the ash released is deposited on the furnace walls resulting in the formation of a thin layer or film of molten ash or slag which adheres to the refractory surface of the walls and quickly provides a sticky surface to which fuel particles, particularly the larger fuel particles in the whirling fuel and air stream will adhere and be completely burned thereon. The rate of combustion of the fuel particles held on the furnace walls is substantially increased by the scrubbing action of the contacting air. The molten slag is discharged from the furnace through the slag outlet while the combustion gases are removed through a flue gas outlet located adjacent to the slag outlet or at an opposite end of the furnace chamber.

In some cyclone furnaces the combustion gas outlet and the slag outlet are disposed at opposite ends of the combustion chamber and the fuel inlet is provided adjacent to the gas outlet. The stream of fuel and air has an inclined direction toward the slag outlet and such stream follows a helical path along the circumferential wall of the combustion chamber. With the admission of secondary combustion air to the whirling fuel stream it is found that the flow in the cyclone combustion chamber displays certain characteristics which are, firstly, an outer vortex flow of gases of spiral shape along the chamber wall in an axial direction, mainly towards the slag outlet, and secondly, an inner core or vortex of gases (induced by the outer vortex due to the change in radial velocity) swirling with the same direction of rotation as the outer vortex, the inner vortex moving rapidly in a direction towards the gas outlet. It has been discovered that operation of the foregoing cyclone furnaces presents a problem wherein a large amount of fines in the fuel mixture entering the combustion chamber escape through the gas outlet only partly burned. The reason for his is that a strong inward radial spiral flow of gases from the fuel inlet to the gas outlet exists so that the fines are "short-circuited" to the gas outlet without spending sufficient time in the furnace necessary to effect complete combustion of same.

It is an object of the present invention to provide novel methods and apparatus for the burning of slag forming fuel.

The present invention contemplates novel methods of burning slag-forming fuel and a cyclone furnace which comprises a cylindrical combustion chamber, circular in transverse cross section, having a combustion gas outlet at one end and a slag outlet at the opposite end. The gas outlet is formed by a throat portion which extends from said one end into the combustion chamber and is spaced from the wall of the chamber to define an annular firing zone at the one end. Fuel inlet means are provided in or adjacent the firing zone and direct a high velocity stream of carrier or primary air and fuel particles tangentially of the chamber wall and in a direction toward the slag outlet to traverse a helical path along said wall. Secondary combustion air, required for the combustion of the fuel particles, is introduced immediately adjacent one side of the fuel inlet means and the remainder of the secondary combustion air is introduced into the combustion chamber at a point intermediate the path of travel of the fuel toward the slag outlet. Tertiary combustion air inlet means are provided in the throat portion and the latter is dimensioned to provide for complete combustion of fuel particles which leave the combustion chamber through the gas outlet in a partly burned condition.

The above and other objects of the present invention will appear more fully hereinafter from a consideration of the detailed description which follows taken together with the accompanying drawing wherein an embodiment of the invention is illustrated.

Figure 2:
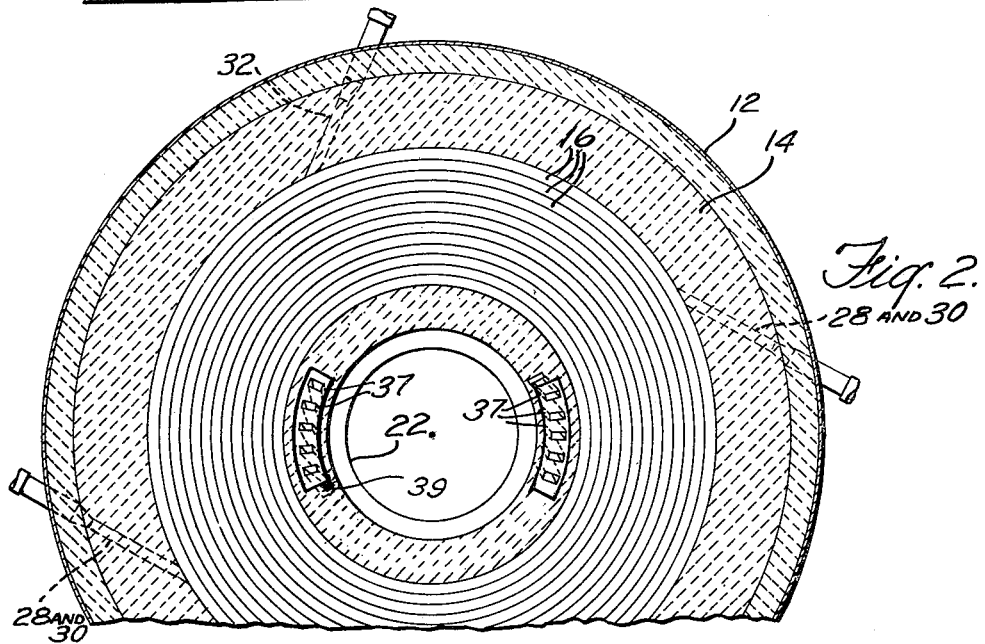

In the drawing:

FIG. 1 is a sectional view, in elevation, of a cyclone furnace embodying the present invention, and FIG. 2 is a sectional view taken along line 2—2 of FIG. 1.

Referring now to the drawing and more particularly to FIG. 1 thereof, a vertically disposed cyclone furnace, generally designated by the numeral 11, comprises a casing 12 provided with suitable refractory 14 having water-cooled tubes 16 disposed therein. Furnace 11 has a substantially cylindrical combustion chamber 18, circular in transverse cross section, provided with a combustion gas outlet 20 at its top and a slag outlet 22 at its bottom. Gas outlet 20 includes a throat portion 24 which extends into chamber 18 and is spaced from and in concentric relationship with a wall 25 of the combustion chamber to define an annular firing zone 26. Located in wall 25 and in firing zone 26 are a pair of diametrically opposite fuel inlet nozzle means 28 (FIGS. 1 and 2) which are connected to sources (not shown) of pulverized slag-forming fuel and primary air. As is well understood by those skilled in the art, the primary air serves as a carrier for the fuel, and the air together with the fuel are introduced into combustion chamber 18 in a high velocity stream. As shown in FIG. 2, fuel nozzles 28 are so disposed with respect to the wall 25 of chamber 18 that the fuel mixture is introduced into the chamber tangentially of the wall and follows a helical path in a direction toward the slag outlet 22. Two groups of diametrically opposed secondary combustion air nozzles 30 connected to a source of air (not shown) are disposed immediately above fuel nozzles 28 and in the same vertical planes for introducing secondary air into firing zone 26 in a horizontal plane. As will be explained hereinafter the secondary air enters chamber 18 at a high velocity and intimately mixes with the stream of burning fuel, passing downwardly therewith in the helical path of flow. Two groups of diametrically opposed secondary combustion air nozzles 32 (only one group shown in FIG. 2) are in wall 25 of chamber 18 between the gas outlet 20 and slag outlet 22 and intermediate the path of flow of the fuel mixture and secondary combustion air from nozzles 28 and 30, respectively. The discharge ends of nozzles 32 at the combustion chamber are arranged in vertical planes normal to the planes containing the discharge ends of fuel nozzles 28 and secondary air nozzles 30 and such nozzles 32 are disposed tangentially to the wall 25 of combustion chamber 18, whereby the secondary air from the last mentioned nozzles supplies the fuel mixture with the remainder of the combustion air.

In the operation of the cyclone furnace structure described up to this point, the flow of fuel and air manifests itself in an outer vortex of burning fuel and air which moves along the wall 25 of chamber 18 toward the slag outlet 22 and an inner vortex of combustion gases in a low pressure area extending between slag outlet and gas outlet 20 which is fed by the outer vortex. The inner vortex rotates in the same direction as the outer vortex and moves upwardly in the combustion chamber for discharge through gas outlet 22. In the outer vortex the ash content of the fuel is rapidly released and due to the centrifugal effect thereon the wall 25 is rapidly coated with a film of molten ash or slag which adheres to the refractory inner surface and provides a sticky surface against which the fuel particles are thrown and to which they adhere. The whirling stream of burning fuel and gases effects a scrubbing and burning of the fuel particles on the slag film on wall 25. Many of the lighter fuel particles burn in suspension while in the outer vortex and the heavier fuel particles burn on wall 25, the slag coating thereon serving to retard the travel of the fuel particles and to retain them in the combustion chamber until combustion is complete. Some of the lighter fuel particles are drawn into the inner vortex where they rapidly find their way out of the combustion chamber by way of gas outlet 20 in a partly burned condition.

Another flow which manifests itself in the operation of the furnace is a strong radial flow of fuel and combustion gases which travels upwardly from the fuel nozzles 28 and secondary air nozzles 30, along the top of the combustion chamber, then down the outer surface of throat portion 24 whence it reverses direction and flows along the interior of throat 24 for discharge through the gas outlet. This flow is indicated in FIG. 1 of the drawing by the arrows 35 and will hereinafter be referred to as the "short-circuited" stream. The "short-circuited" stream carries mainly "fines," or lighter fuel particles, which escape from the fuel stream issuing from fuel nozzle 28 and inasmuch as the residence time of such fines in the furnace is small as compared with the heavier fuel particles in the outer vortex and in the slag coating on wall 25 the fines in the short-circuited stream do not reach complete combustion.

An object of the present invention is to provide for complete combustion of the fines or lighter fuel particles which escape from the combustion chamber in a partly burned condition. To this end, throat portion 24 is extended into combustion chamber 18 for a predetermined distance to increase the path of flow for the short-circuited stream so as to increase the residence time of the fines in the combustion chamber. The optimum height of the throat portion 24 or its projection into the combustion chamber, is one which when combined with the distance between the throat portion and wall 25 provides a path of flow for the short-circuited stream which is equal to the path of flow traversed by the outer vortex. Thus, if the height of the inner and outer surfaces of throat portion 24 were added to the distance of the inner surface of chamber 18 (between the outer surface of the throat and wall 25) it should be equal to the distance traveled by the outer vortex in the combustion chamber. In practice, it is difficult to design the path of flow of the short-circuited stream equal to the path of flow of the outer vortex because of other factors, but the desired object is to approach this condition as much as possible. In any event, the extension of the throat portion 24 serves to increase the length of the path of flow of the short-circuited stream thereby increasing the combustion efficiency of the cyclone furnace.

Throat portion 24 has a restricted upper end which accommodates a pair of groups of oppositely disposed tertiary combustion air vanes or nozzles 37 supplied with combustion air by way of a pair of segmental headers 39. A conduit 40 is connected to each header 39 and extends outside casing 12 for connection to a source of air (not shown) to supply the headers with air. The vanes 37 direct air tangentially of the inner surface of throat portion 24 and in the same direction as the stream of fuel and combustion gases from combustion chamber 18 which traverse a helical path within the throat portion. The tertiary air stream from nozzles 37 serves to produce a turbulent condition of the incoming stream from the combustion chamber to promote the combustion of the incompletely burned fines entering the throat portion from the inner vortex and the short-circuited stream. The combustion gases in throat portion 24 then flow into an enlarged passage 42 immediately above the throat 24, whence the gases are conducted to steam generating apparatus (not shown).

In the operation of the subject cyclone furnace the rate of flow of the primary air through nozzles 28 is 80 to 100 ft. per second and the temperature of said air is approximately 150° F. with the volume of primary air constituting 10 to 15% of the total air required. The velocity of the secondary air through nozzles 30 and 32 is between 250 to 300 ft. per second while that through tertiary air nozzles 37 is 80 to 100 ft. per second. The temperatures of the secondary and tertiary air are approximately 700° F. and 150° F., respectively and the percentage of total air is in the order of 80% and 5 to 8%, respectively.

In considering the operation of the cyclone furnace of the present invention, the efficiency of the furnace is enhanced by the provision of a pair of groups of diametrically opposed fuel nozzles 28 and secondary air nozzles 30 because with one group the resulting stream of fuel and primary and secondary air would tend to flow to the center of the combustion chamber without traversing its entire path of flow to the bottom of the combustion chamber. Furthermore, the extension of slag outlet 22 above the floor of combustion chamber 18 increases the combustion efficiency because of the formation of a slag pool throat which traps and retains unburned fuel particles until all of the combustible is consumed and the ash content is released.

Although one embodiment of the present invention has been illustrated and described in detail it is to be understood that the invention is not limited thereto. Various changes can be made in the steps of the method and in the design and arrangement of parts without departing from the spirit and the scope of the invention as the same will now be understood to those skilled in the art.

What is claimed is:

1. In a cyclone furnace of the class described, a cylindrical shaped combustion chamber, means forming a slag outlet at one end of said chamber for discharging slag formed in the chamber, an annular wall extending from the opposite end of the chamber into the latter to provide a gas outlet throat, said annular wall being spaced from the wall of the combustion chamber and defining therewith an annular firing zone, oppositely disposed means extending in vertical planes for introducing a high velocity stream of air and slag forming fuel into said firing zone, oppositely disposed means for injecting secondary combustion air into said firing zone and into said combustion chamber between said firing zone and said slag outlet, and oppositely disposed means for introducing tertiary combustion air into said annular throat tangentially thereof and in admixture with the combustion gases flowing through said throat.

2. In a cyclone furnace of the class described, a cylindrical shaped combustion chamber, means forming a slag outlet at one end of said chamber for discharging slag formed in the chamber, an annular wall extending from the opposite end of the chamber into the latter to provide a gas outlet throat, said annular wall being spaced from the wall of the combustion chamber and defining therewith an annular firing zone, nozzle means disposed oppositely from one another and extending in longitudinal planes in said firing zone and injecting slag forming fuel and primary air into said combustion chamber, second nozzle means arranged in oppositely disposed relationship to one another in said firing zone and between said first nozzle means and said opposite end for supplying part of the required secondary combustion air to the combustion chamber, third nozzle means arranged in oppositely disposed relationship to one another and between the two nozzle means and the slag outlet and adapted for supplying the remainder of secondary combustion air to the combustion chamber, and fourth nozzle means arranged in oppositely disposed relationship to one another in said throat so as to supply tertiary combustion air tangentially thereof and to combustion gases flowing through said throat to aid in the combustion of partly burned fuel particles flowing with the combustion gases flowing through said throat.

3. In a cyclone furnace of the class described, a combustion chamber defined by a cylindrical shaped wall and oppositely disposed ends, means forming a slag outlet at one end of said chamber for discharging slag formed in the chamber, an annular wall extending from the opposite end of the chamber and into the latter to provide a gas outlet throat, said annular wall being spaced from the wall of the combustion chamber and defining therewith an annular firing zone, first nozzle means disposed oppositely from one another and extending in longitudinal planes in said firing zone and in the wall of the combustion chamber and spaced from said other end for injecting slag forming fuel and primary air into said combustion chamber, second nozzle means occupying the wall in oppositely disposed relationship to one another between the first nozzle means and said other end of the combustion chamber for supplying part of the required secondary combustion air to the chamber, third nozzle means provided in oppositely disposed relationship in the wall of the combustion chamber and disposed between the first nozzle means and the slag outlet and adapted for supplying the remainder of the secondary combustion air to the combustion chamber, and fourth nozzle means arranged in oppositely disposed relationship in said throat so as to supply tertiary combustion air tangentially thereof and to combustion gases flowing through said throat to aid in the combustion of unburned fuel particles flowing with the combustion gases passing through said throat.

4. The cyclone furnace of claim 3 wherein the fourth nozzle means is disposed at the end of said throat adjacent said one end of the combustion chamber.

5. In a cyclone furnace of the class described, a cylindrical shaped combustion chamber, means forming a slag outlet at one end of said chamber for discharging slag formed in the chamber, an annular wall extending from the opposite end of the chamber into the latter to provide a gas outlet throat, said annular wall being spaced from the wall of the combustion chamber and defining therewith an annular firing zone, a pair of nozzles diametrically opposed and extending in vertical planes and disposed in said firing zone for injecting slag forming fuel and primary air into said combustion chamber, a pair of diametrically opposed secondary combustion ports disposed in the planes of the nozzles and arranged in said firing zone between said nozzles and said opposite end of the chamber for supplying part of required secondary combustion air to the combustion chamber, a second pair of diametrically opposed secondary combustion air ports circumferentially disposed intermediate the planes containing the nozzles and the first pair of combustion air ports and longitudinally disposed between said nozzles and said slag outlet for supplying the remainder of secondary combustion air to the combustion chamber, and means forming a pair of diametrically opposed tertiary combustion air ports communicating with said throat for supplying tertiary air to combustion gases.

6. In a cyclone furnace of the class described, a cylindrical shaped combustion chamber arranged with its axis substantially vertical, means forming a slag outlet at the bottom of said chamber, an annular wall having a longitudinal axis coincident with the axis of the chamber and spaced from the wall of the latter to define therewith an annular firing zone, said annular wall extending from the top of said combustion chamber to provide a gas outlet throat for combustion gases formed in said chamber, first nozzle means disposed in said firing zone diametrically opposite each other and extending in vertical planes for injecting slag forming fuel and primary air into said combustion chamber, second nozzle means arranged in said firing zone in diametrically opposed relationship to each other and disposed above the first nozzle means for supplying part of the required secondary combustion air to the combustion chamber, third nozzle means arranged in diametrically opposed relationship to each other below said first nozzle means and adapted for supplying the remainder of the secondary combustion air to the combustion chamber, and fourth nozzle means arranged in said throat in diametrically opposed relationship to one another and so as to supply tertiary air tangentially of said throat and to the combustion gases.

7. The cyclone furnace of claim 6 wherein the slag outlet is substantially circular in horizontal cross-section and has a longitudinal axis coincident with the axis of the combustion chamber.

References Cited in the file of this patent

UNITED STATES PATENTS

| | | |
|---|---|---|
| 2,616,256 | Davy et al. | Nov. 4, 1952 |
| 2,833,230 | Krug | May 6, 1958 |
| 2,855,873 | Von Swietochowski | Oct. 14, 1958 |

FOREIGN PATENTS

| | | |
|---|---|---|
| 1,058,176 | France | Mar. 15, 1954 |
| 736,418 | Great Britain | Sept. 7, 1955 |
| 744,949 | Great Britain | Feb. 15, 1956 |